United States Patent

Fichter

[15] 3,680,573
[45] Aug. 1, 1972

[54] PILOT VALVE OPERATED FLUIDIC VALVE

[72] Inventor: Barry S. Fichter, Dunellen, N.J.

[73] Assignee: American Standard Inc., New York, N.Y.

[22] Filed: May 5, 1970

[21] Appl. No.: 34,780

[52] U.S. Cl. .................................................137/81.5
[51] Int. Cl. ...................................................F15c 3/04
[58] Field of Search.......................................137/81.5

[56] References Cited

UNITED STATES PATENTS

| | | | |
|---|---|---|---|
| 3,561,465 | 2/1971 | de Graaf | 137/81.5 |
| 3,575,210 | 4/1971 | Fussell | 137/81.5 X |
| 3,587,752 | 6/1971 | Smith | 137/81.5 X |
| 3,467,123 | 9/1969 | Perkins | 137/81.5 |
| 3,417,772 | 12/1968 | Schaeffer | 137/81.5 |
| 3,392,741 | 7/1968 | Shinn | 137/81.5 |
| 3,312,234 | 4/1967 | Morey | 137/81.5 |
| 3,468,330 | 9/1969 | Moore et al. | 137/81.5 |
| 3,478,765 | 11/1969 | Kirk | 137/81.5 |
| 3,482,696 | 12/1969 | Jones, Jr. | 137/81.5 X |
| 3,489,009 | 1/1970 | Rimmey | 137/81.5 X |
| 3,513,866 | 5/1970 | Boothe et al. | 137/81.5 |

*Primary Examiner*—Samuel Scott
*Attorney*—Sheldon H. Parker, Tennes I. Erstad and Robert G. Crooks

[57] ABSTRACT

A fluidic valve is provided with a pilot valve for controlling the operation of the fluidic valve, at least insofar as permitting the flow of fluid through the valve is concerned. Opening of the pilot valve produces a pressure in balance on a primary diaphragm thereby permitting the flow of fluid through the fluidic valve. The fluid pressure of the fluid entering the valve inlet serves to maintain the valve in the "on" position. The fluidic valve is so designed that under this state of flow, the fluid entering the valve attaches to a first wall and flows out of the valve through an outlet port. As typical for fluidic valves closing of the sensing or control port to the fluid valve causes the fluid to flip over and attach to a second wall. Flow along the second wall results in fluid to flow to region or chamber between primary diaphragm and the pilot valve thereby producing a pressure balance such that both the primary diaphragm and the pilot valve are pressurized in the closed position.

12 Claims, 6 Drawing Figures

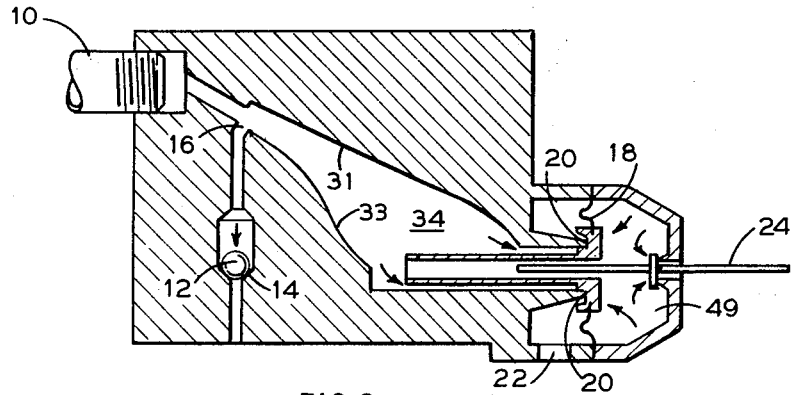
FIG. 1 (OFF)
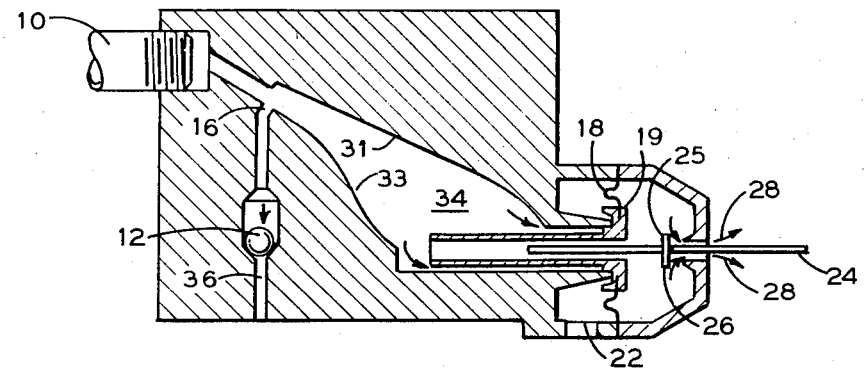
FIG. 2 (START)
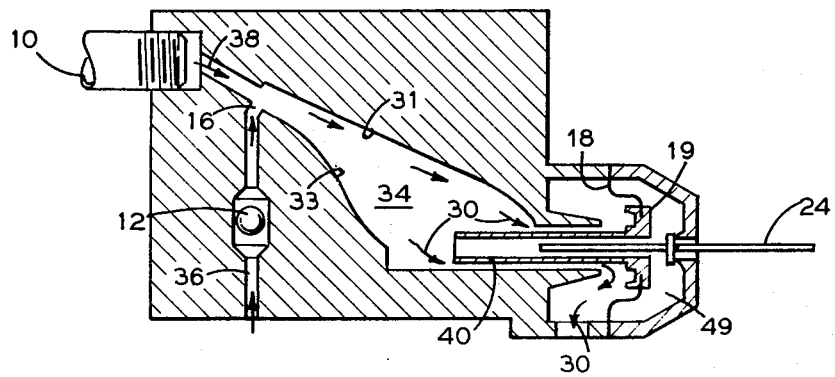
FIG. 3 (FULL FLOW)
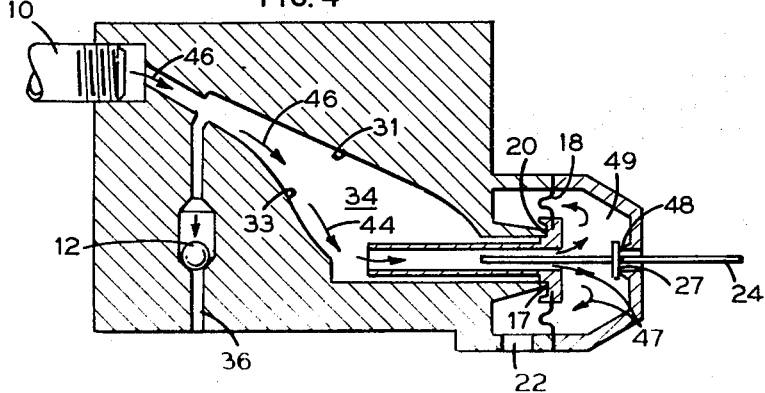
FIG. 4
INVENTOR
Barry S. Fichter
BY Sheldon H Parker
ATTORNEY

PILOT VALVE OPERATED FLUIDIC VALVE

BACKGROUND OF THE INVENTION

1. Field of the Invention

This invention relates to a fluidic valve mechanism, and more particularly, to a fluidic valve which employs a diaphragm type of valve seal and additionally employs a pilot valve which controls the diaphragm type of valve seal.

2. Description of the Prior Art

Fluidic valves of many different types and designs have been proposed for controlling the starting and stopping of the flow of fluids. In one type of application, the valve is designed so as to automatically maintain itself in the "on" position until the fluid in a reservoir reaches a predetermined level and then automatically stops the flow and maintains itself in the "off" position.

A typical situation is found in the case of water closet tank refill devices. These devices are characteristically noisy, are excessively subjected to wear and do not stay in the full open position during the entire filling operation, but rather begin a slow close procedure well before the tank is completely filled. Furthermore, these valves require the use of a large float and lever arm mechanism and are relatively expensive.

A further problem is that leakage of any sort from the tank causes the water control valve to open, thus replenishing the water lost due to leakage. A permanent "on" situation could thus be produced, resulting in flooding or the like.

Although fluidic valves offer a solution to the aforenoted problems in water closet refill mechanism, it is typically found that an undesirably large force is required to initially actuate the fluidic valve.

SUMMARY OF THE INVENTION

It has now been found that a fluidic valve mechanism can be designed such that it can maintain itself in the open position and then automatically close itself, and through the use of a pilot valve, only require a small force to start or stop.

The mechanism includes a primary fluid inlet, a control chamber, a control inlet to the control chamber and a primary outlet from the control chamber. A diaphragm valve is moveable from a position in which it closes the primary outlet to a position in which fluid can flow through the primary outlet.

A conduit is provided between the region of one wall of the control chamber and an enclosed chamber on the pilot valve side of the diaphragm valve.

The enclosed chamber is provided with a pilot valve which can be readily moved to release the pressure on the pilot valve side of the diaphragm valve.

The opening of the pilot valve and the consequent release of pressure on one side of the diaphragm valve serves to permit the fluid pressure to move the diaphragm valve away from its sealing position. The control chamber is designed such that the fluid flowing through the fluid inlet tends to attach to a wall of the control chamber which is opposite the aforementioned one wall of the control chamber, so long as the control inlet is open. Closing of the control inlet causes the fluid flowing through the primary inlet to attach to the aforementioned one wall, flow through the conduit between the region of the one wall and the enclosed chamber, thereby pressurizing the enclosed chamber. Pressurizing of the enclosed chamber causes the diaphragm valve to move to its sealing position, thereby stopping the fluid through the primary outlet.

BRIEF DESCRIPTION OF THE DRAWINGS

The objects, features and advantages of the present invention will be fully understood as the description of the invention proceeds, particularly when taken together with the accompanying drawings wherein like reference numerals indicate similar parts throughout the several drawings and wherein:

FIG. 1 is a schematic representation of a valve mechanism in accordance with the present invention, said mechanism being in the "off" position;

FIG. 2 is a schematic representation of the mechanism of FIG. 1, in the "start" position;

FIG. 3 is a schematic representation of the mechanism of FIG. 1, in the "full flow" position;

FIG. 4 is a schematic representation of the valve structure of FIG. 1 in the "Stop" position;

DESCRIPTION OF THE PREFERRED EMBODIMENTS

Figure 5:
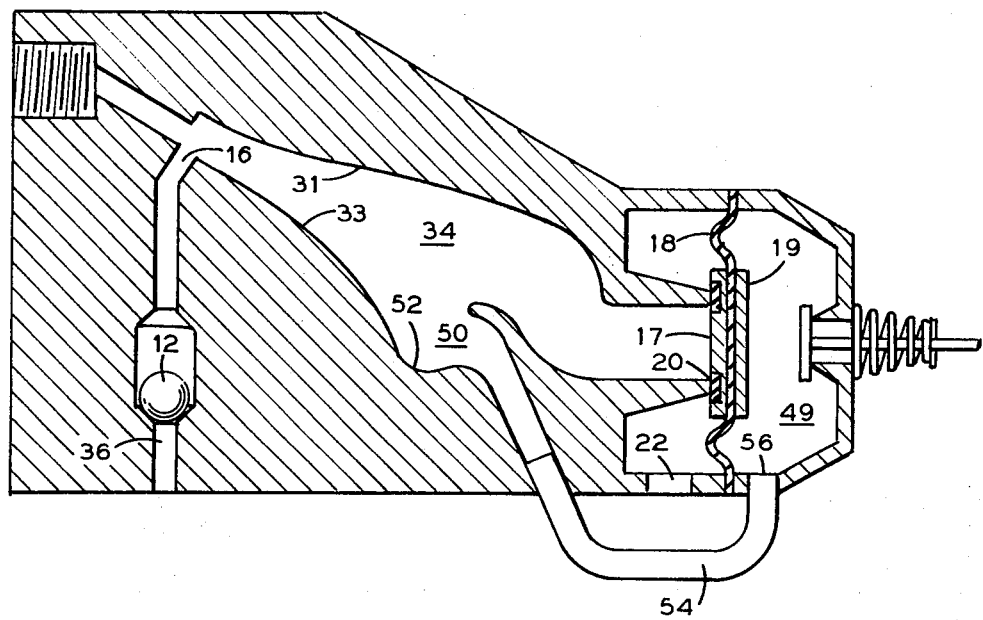
FIG. 5 is a schematic representation of another embodiment of a valve in accordance with the present invention.

The filling mechanism is normally at rest in the "off" position as shown in FIG. 1.

Conduit 10 is at all times in communication with the supply fluid. In the case of a water closet refill system, water at a pressure in the range from 5 to 120 pounds per square inch would be supplied to conduit 10. The fluid pressure acts on ball 12, keeping the ball firmly seated on valve seat 14, thus sealing the control or sensing opening 16. Similarly, the diaphragm 18 is firmly seated against the valve seat 20, sealing the passage to refill conduit 22.

As shown in FIG. 2 in order to start the refill operation, the plunger 24 is depressed against the force of fluid pressure on the surface 25, of the pilot of valve member 26. The resultant flow of fluid as indicated by arrows, 28, decreases the fluid pressure on the surface 19, of the diaphragm 18. The resultant movement of the diaphragm 18 opens the passage to the refill conduit 22, thus permitting fluid to flow around the conduit 40 through the refill conduit 22 and into the receptacle being filled, as indicated by the arrows 30. Air is aspirated through the control conduit 36 as a result of the low pressure created by fluid entrainment in the jet issuing from the inlet nozzle 38. The jet then attaches to the upper wall 31 of the control or interaction chamber 34 and continues to do so, until the aspiration through the port 16 is stopped. The jet attachment to the wall 31 is achieved by proper dimensioning and design of the inlet nozzle 38 and the chamber 34, as is well known in the art.

The switching action that is, the flip over of the jet stream from wall 31 to wall 33, can either be accomplished by injecting or aspirating a fluid at an appropriate control point, as is well known in the art. The use of an aspiration arrangement is employed for the purpose of illustration.

With the cessation of air flow into the control chamber 34 as shown in FIG. 4, the jet indicated by arrows 46 will attach to the lower wall 33 of the control chamber 34 and enter the end 44 of the conduit 40, thereby supplying fluid under pressure to the enclosed diaphragm chamber 49, as indicated by the arrows 47.

The pilot valve 26 is subjected to pressure on one surface 25 thereby forcing it opposite surface 27 against the valve seat 48. Similarly, the fluid pressure on the surface 19 of the diaphragm 18 forces the diaphragm surface 17 against the valve seat 20. Fluid flow through the outlet conduit 22 is thus stopped. Line pressure will then exert a force through control port 16 which seats ball 12, thus stopping all flow of fluid (water and air) through the duct 16 and conduit 36.

The valve mechanism can be positioned so that the vent opening 16 and control conduit 36 are at a height which would suit the application. It is evident that either the conduit 36 can be of the required length or an extension conduit can be provided in communication with and extending from the conduit 36.

Flow through the device can be started manually, or through hydraulic or mechanical linkage to a machine or appliance, or it can be started electrically by use of a solenoid.

Control conduit 36 can be connected to the control chamber 34 by any convenient type of conduit, either flexible or rigid, as required in the particular application, or can be fixed in position and have a flexible or rigid conduit extending the required distance.

For example, the system can be used to regulate the filling of a bath tub to a predetermined height. The control conduit 36 could in such a case be extended by means of a telescoping linkage or a flexible conduit.

The duct 16 can be sealed by means of a conventional stem or check valve in lieu of the ball valve. Similarly, the diaphragm chamber could employ, in lieu of the diaphragm 18 or pilot valve 26 any equivalent type of pressure sealing mechanism.

The refill control device can be simply injection molded in two mirror image halves. The valve seats 14 and 20 can be formed at the time of the molding or can be inserts which are set in place before the two halves are sealed to each other. In the case of insert type valve seats, circumferential grooves can be employed for receiving the seats and holding them in place.

As shown in FIG. 5, the means for providing communication between the enclosed diaphragm chamber 49 and a region proximate the wall 33, of the chamber 34, can include an opening 50, in a curved region 52, of the wall 33. In this case, a conduit 54 is employed to provide communication between the opening 50 in the wall 33, and an inlet 56 to the enclosed diaphragm chamber 49.

Figure 6:
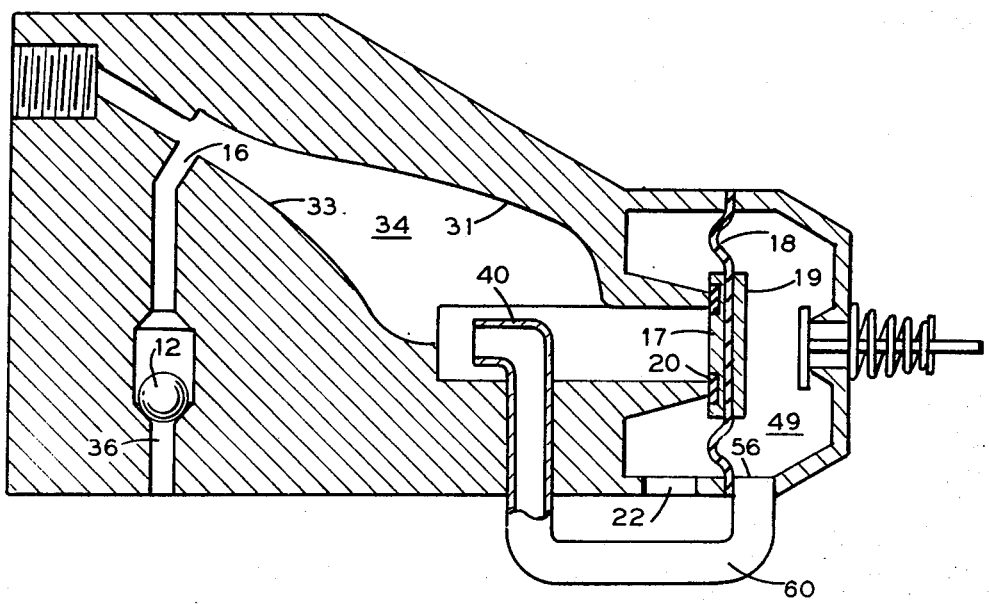
FIG. 6 is a schematic representation of a further embodiment of a valve structure.

FIG. 6 shows another alternative in which the conduit 40 communicates with the enclosed diaphragm chamber 49 by means of a conduit 60. In this case the conduit 40 is not carried by and moveable with the diaphragm 18, but rather, is fixed in position.

Also, the fluid flow through the conduit 40, rather than being through the diaphragm 18, is through the conduit 60 and the diaphragm chamber inlet 56 into the enclosed diaphragm chamber 49.

The fluid pressure on the surface 19, of the diaphragm 18, is effectively the same in each of the modifications illustrated in FIG. 1 through 4, 5 and 6.

In each case the closing of the valve and stopping of the fluid flow out of the outlet 22, is dampened because the fluid pressure on the diaphragm surface 17 offsets to some extent the greater force on the other surface 19, of the diaphragm 18. This serves to minimize the problem of water hammer, which is typically produced when a valve closes.

Although the invention has been described in its preferred forms with a certain degree of particularity, it is understood that the present disclosure of the preferred forms has been made only by way of examples and that numerous changes in the details of construction and the combination and arrangement of parts may be resorted to without departing from the spirit and the scope of the invention.

What is claimed is:

1. A fluidic valve mechanism comprising in combination;
   A. a control chamber having:
      a. a first wall
      b. a second wall
      c. a primary fluid inlet
      d. a control fluid port, and
      e. a primary fluid outlet:
   B. an enclosed valve chamber having:
      a. pilot valve means for opening and closing a fluid port in said enclosed chamber:
   C. conduit means having:
      a. a first end, said first end being proximate said first wall of said control chamber.
      b. a second end, said second end being in said enclosed valve chamber, and
   D. primary valve means for controlling the flow through said primary fluid outlet, said primary valve means having,
      a. a first surface in communication with said enclosed valve chamber
      b. a second surface in communication with said control chamber, the effective surface area of said first surface being greater than the effective surface area of said second surface, and said valve member being movable between a first position and a second position, and serving to close said primary fluid outlet when at said second position.

2. The structure of claim 1, wherein said primary valve means is a diaphragm valve.

3. The structure of claim 1, wherein said pilot valve means has a first surface in communication with said enclosed valve chamber and a second surface in communication with said fluid port in said enclosed chamber.

4. The structure of claim 1, further comprising a valve seat enclosing said fluid port in said enclosed chamber, said valve seat cooperating with said second surface of said pilot valve means to close said fluid port.

5. The structure of claim 1, wherein said conduit means comprises an elongated cylinder, said second end being fixed to said primary valve means.

6. The structure of claim 5, wherein said primary valve means is a diaphragm valve and said cylinder passes through said diaphragm.

7. The structure of claim 1, further comprising a check valve for limiting fluid flow through said control fluid port, to one direction of flow.

8. The structure of claim 7, wherein said check valve is a ball valve.

9. In a fluidic valve mechanism having a control chamber, in which a primary fluid inlet normally directs fluid towards a first wall, but the fluid flow flips over towards a second wall in response to a fluid flow change at a control fluid port, and in which the primary fluid flow through the fluidic valve outlet is controlled by a primary valve means, the improvement comprising:

an enclosed valve chamber having pilot valve means for opening and closing a fluid port in said enclosed chamber.

conduit means having a first end, said first end being proximate said second wall of said control chamber, a second end, said second end being in said enclosed valve chamber, and primary valve means having:

a first surface in communication with said enclosed valve chamber, a second surface in communication with said control chamber, the effective surface area of said first surface being greater than the effective surface area of said second surface, and said valve member being movable between a first position and a second position, and serving to close said primary fluid outlet when at said second position.

10. A fluidic valve mechanism comprising in combination:
1. a control chamber having a pair of opposed diverging walls, said walls diverging in the downstream direction, a primary fluid inlet, a control fluid port proximate said primary fluid inlet, and a primary fluid outlet;
2. conduit means having a first end, said first end being proximate one of said opposed diverging wall chamber, and a second end, said second end opening into an enclosed valve chamber, said conduit means being positioned in said controlled chamber and extending through said primary fluid outlet, and providing communication between said primary fluid inlet and said enclosed valve chamber;
3. an enclosed valve chamber having pilot valve means for opening and closing a fluid port;
4. primary valve means for controlling fluid flow through said primary fluid outlet, having a first surface forming one wall of said closed valve chamber, and a second surface which moves into and out of engagement with said primary fluid outlet in order to open and close said primary fluid outlet, the effective surface area of said first surface being substantially greater than the effective surface area of said second surface.

11. The structure of claim 10 wherein said conduit means is fixed to said primary valve means and moves along with said primary valve means as said valve means moves between a first position and a second position to close the fluidic valve mechanism.

12. A fluidic valve mechanism comprising in combination:
1. a control chamber having a first wall, a second wall, a primary fluid inlet, a control fluid port and a primary fluid outlet, said first wall diverging from said second wall in the direction of said primary fluid outlet,
2. a valve chamber having pilot valve means for opening and closing a fluid port in said valve chamber, a diaphragm valve forming one wall of said valve chamber,
3. conduit means in said control chamber and extending from a position proximate said first wall through said diaphragm thereby providing communication between interior of said control chamber diaphragm and the interior of said valve chamber,
4. valve means carried by said conduit means and said diaphragm for closing said primary fluid outlet, said conduit means passing through said primary fluid outlet and being dimensioned so as to permit flow around said conduit and through said primary fluid outlet when said primary valve means is in the open position.

* * * * *